United States Patent [19]

Nuutio

[11] Patent Number: 4,877,103
[45] Date of Patent: Oct. 31, 1989

[54] POWER TRANSMISSION APPARATUS

[75] Inventor: Erkki Nuutio, Tampere, Finland

[73] Assignee: Autojoukko OY, Finland

[21] Appl. No.: 170,761

[22] Filed: Mar. 21, 1988

[30] Foreign Application Priority Data

Mar. 19, 1987 [FI] Finland ................... 871218

[51] Int. Cl.⁴ ............................................. B60K 17/30
[52] U.S. Cl. ..................................... 180/259; 464/143; 464/906
[58] Field of Search ............... 180/259, 258, 254, 263; 464/906, 178, 141, 142, 143

[56] References Cited

U.S. PATENT DOCUMENTS

| 1,995,987 | 3/1935 | Keese | 180/259 |
| 2,685,184 | 8/1954 | De Nador et al. | 180/259 |
| 4,536,038 | 8/1985 | Krude | 180/259 |
| 4,632,203 | 12/1986 | Krude | 280/690 |

Primary Examiner—David M. Mitchell
Assistant Examiner—Karin Tyson
Attorney, Agent, or Firm—Steinberg & Raskin

[57] ABSTRACT

Power transmission apparatus especially suited for wheels of a vehicle, having an outer joint section coupled to a driving shaft and an inner joint section coupled to a driven shaft, with the driven shaft being rotatably mounted in a frame. An inner end of the frame is at least partially situated within a movement range of the outer joint section when the driving shaft and driven shaft are turned at an angle with respect to one another. At least one notch is also provided in the frame, into which the outer joint section at least partially penetrates when the turning angle between the driven shaft and driving shaft is sufficiently large.

20 Claims, 5 Drawing Sheets

POWER TRANSMISSION APPARATUS

BACKGROUND OF THE INVENTION invention relates to an arrangement in power transmission, especially in wheel hubs of turning wheels in a vehicle, in which power is transmitted to the hubs from a driving shaft such as a drive shaft to the driven shaft by means of a constant velocity joint having an outer section fastened to the driving shaft and an inner section fastened to the driven shaft which is rotatably supported in a wheel bracket frame surrounding the driven shaft by means of a first or outer bearing and a second or inner bearing.

Designs in which wheels that steer a vehicle, normally front wheels, also drive the vehicle are popular in cars and vans. However, these are principally used in heavier vehicles only in association with all-wheel drive systems. Constant velocity joints of various types and positionings are used in automobiles and vans. However, it has usually not been possible to use constant velocity joints in heavier vehicles for the reasons described below.

In heavy vehicles it has been possible to use double cardan joints in association with beam-type axle systems.

An axle system with both steering and driving functions must, among other factors, meet the following requirements. Because of lateral and longitudinal forces being applied to the wheel, the bearing distance of the wheel bearings must be sufficiently large, in practice at least 15% of the tire diameter. The bearings must also be located centrally with respect to the width of the tire. Because of the lateral and longitudinal forces, the intersectional point of continuation of the steering axis of the wheel and the road surface must be located approximately in a center plane of the tire. In other words, the maximum distance of this intersectional point from a center plane of the tire must be less than 15% of the width of the tire. Because the change of the length of the drive shaft when the wheel is turned has to be limited, the center point of the constant velocity joint or some other power transmission joint must be approximately located at the wheel turning axis.

As stated above, several different solutions are known in association with cars and vans, in which the power is transmitted from the driving shaft to the turning wheel by means of a constant velocity joint. The most common sign in cars and vans is such that the fastening of the turning wheel and the brake disc, the wheel bearings, and an outer section of the constant velocity joint are located one after another. This type of arrangement has previously been described, for instance, in the publication Lagerungen der Vorderrader frontgetriebener Personenkraftwagen, FAG Kugelfischer, Publication No. 05115 DA.

A reversed arrangement is described in DE Publication 2,548,722 corresponding to U.S. Pat. No. 4,094,376. In this arrangement, the outer section of the constant velocity joint is fastened to the driving shaft, and the inner section to the wheel hub. In this system, the constant velocity joint and the wheel bearings are also arranged one after the other, which makes the design extremely long over the axial direction. It has also not been possible to take advantage of the space between the wheel bearings in the arrangement in accordance with this DE Publication.

If the wheel bearings and the constant velocity joints are positioned in a fashion known from the above-noted publications, it is necessary to move the center point of the constant velocity joint very far away from the center plane of the tire which, in heavy vehicles, is caused by the wide bearing distance of the bearing system and by the large size of the constant velocity joint. Therefore, with this arrangement, it is not possible to meet the requirements described above, namely that the center point of the constant velocity joint should approximately be located on the wheel turning axis. This is due to the fact that the lateral inclination of the wheel turning axis (king pin angle, KPA) must not be too high. A lateral inclination of approximately 3° to 10° is generally considered to be acceptable.

An arrangement is known from DE Publication 2 903 231, in which inner rings of the wheel bearings are so connected to be a fixed part of the wheel hub, and the diameter of the bearing has been made sufficiently large in order to be able to fasten the entire outer section of the constant velocity joint within the bearing system. However, in heavier vehicles this kind of arrangement is not practical, as it leads to very large-diameter bearings, for instance on the order of 300 mm. Another drawback of constructional arrangements described above, is the fact that it has become customary to use specially designed, angular-contact ball bearings of relatively low bearing capacities in such constructional arrangements.

Similar arrangements are also described in U.S. Pat. Nos. 4,119,167 and 4,273,460, in GB patent application No. 2,155,414 and in SE Publication No. 437,491. In all of these arrangements, the wheel bearings and the constant velocity joints are positioned, one after another, which makes the designs extremely long in the axial direction. These references have also failed to take advantage of the space between the wheel bearings.

SUMMARY OF THE INVENTION

Accordingly, it is an object of the present invention to eliminate the above-noted disadvantages and shortcomings in the prior art.

It is also an object of the present invention to provide a power transmission joint with a very short axial length.

It is an additional object of the present invention to provide a sufficiently large turning angle between a driving shaft and a driven shaft in a power transmission joint.

It is a further object of the present invention to provide a power transmission joint which is especially suited for use in heavy vehicles.

These and other objects are attained by the present invention which is directed to apparatus for power transmission, in which power is transmitted from a driving shaft to a driven shaft through a joint having an outer section coupled to the driving shaft, and an inner section coupled to the driven shaft. The driven shaft is rotatably supported in a frame surrounding the same. More particularly, the inner section of the joint is coupled to the driven shaft and is positioned in a manner such that an inner end of the frame is at least partially situated within a movement range of the outer section of the joint, when the driving shaft and driven shaft are turned at an angle with respect to one another. At least one notch is provided in the frame and extends in a direction substantially perpendicular to a direction of the angular turning of the driving shaft and driven shaft with respect to one another. The outer section of the joint at least partially penetrates into the at least one notch, when the turning angle between the driven shaft and the driving shaft in a direction of the notch, is sufficiently large.

The joint itself, may be a constant velocity joint, with power being transmitted to wheels of a vehicle from the driving shaft through the driven shaft, with the frame thus being a bracket for the rotating wheel. The driven shaft is rotatably supported on the frame through at least one bearing, preferably two bearings, spaced from one another in a direction along the driven shaft with the notch being formed in the frame between the first and second bearings. The at least one bearing is also at least partially situated within the movement range of the outer joint section when the shafts are so turned, with an inner bearing so situated when two separate bearings are provided.

Two such notches are preferably provided to extend along both sides of a plane passing through an axis of the driven shaft, with the notches extending preferably substantially vertically on both sides of a vertical axial plane passing through the driven shaft.

In this regard, the present invention is also directed to apparatus for transmitting power, comprising a drive shaft, a driven shaft, and a joint for coupling the drive and driven shafts to one another and comprising an outer section fastened to the drive shaft, and an inner section fastened to said driven shaft, with said drive and driven shafts being turnably mounted with respect to one another. A frame is also provided in which the driven shaft is rotatably mounted, with the inner section and frame being positioned to be at least partially located within the outer joint section, when the drive and driven shafts are turned with respect to one another by a certain angle. Additionally, the frame comprises at least one notch extending to permit the outer joint section to extend thereinto, when the drive and driven shafts are so turned by the certain angle.

Therefore, an object of the present invention is to provide a new kind of arrangement in power transmission, particularly in association with wheel hubs of the turning wheels of heavy vehicles, in which the above-described drawbacks and shortcomings are non-existent. In order to attain this object and other objects, principle characteristic features of the present invention include an inner section of a constant velocity joint being fastened to a driven shaft in such a manner that, when a driving shaft and the driven shaft are turned to an angle with respect to each other, an inner bearing and an inner end of a wheel bracket frame are at least partially located within a movement range of an outer section of the constant velocity joint, and principally vertical notches having been formed in the wheel bracket frame in a region between an outer or first bearing and the inner or second bearing and on both sides of an axial vertical plane passing through the driven shaft, with the outer section of the constant velocity joint being arranged to partially penetrate into one of the notches when the turning angle between the driven shaft and the driving shaft in the direction of the notch is sufficiently great.

In accordance with a preferred embodiment of the present invention, an axial recess opening in a direction towards a hub of a wheel is formed into the inner section of the constant velocity joint, within which the second or inner bearing and the inner end of the wheel bracket frame are at least partially located.

It is believed that the most important advantages of the present invention when compared with the prior art, include the axial length of a design in accordance with the invention herein being extremely short, it still being possible to use conventional tapered-roller bearings, and the invention also providing a sufficiently large turning angle between the driving shaft and the driven shaft. Due to these advantages, a design in accordance with the present invention is extremely well-suited to be used especially in heavy vehicles such as lorries and buses, and in various other vehicles and construction machinery.

BRIEF DESCRIPTION OF THE DRAWINGS

The present invention will now be described in greater detail, in exemplary fashion only, with reference to the accompanying figures, in which.

DESCRIPTION OF THE PREFERRED EMBODIMENTS

Figure 1:
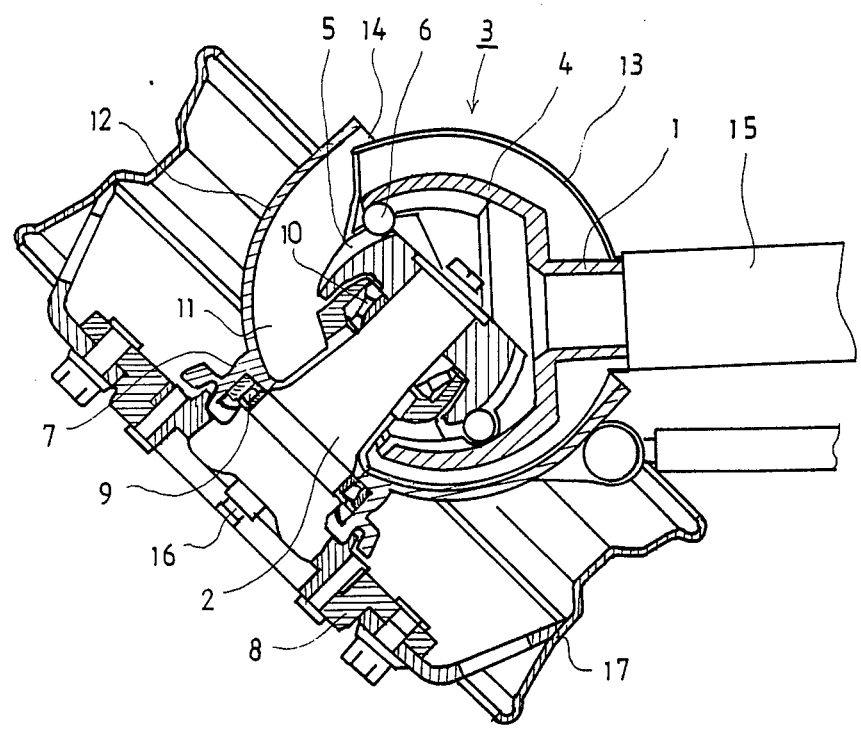
FIG. 1 is a horizontal, sectional view of a transmission arrangement in accordance with the present invention.
Figure 2:
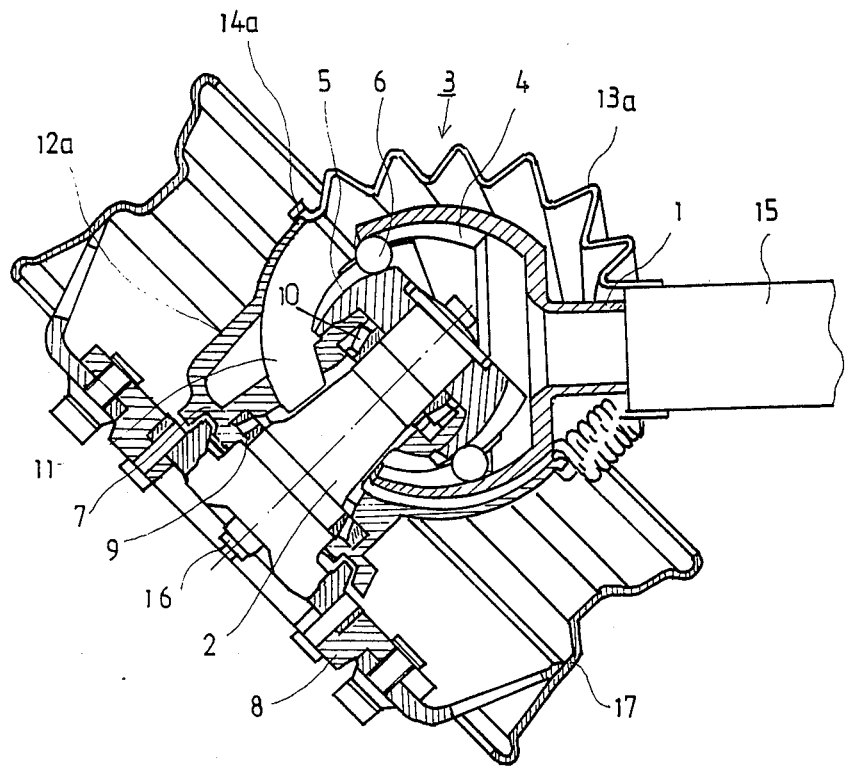
FIG. 2 is a horizontal, sectional view of an alternative embodiment to the arrangement shown in FIG. 1.

FIGS. 1 and 2 are sectional illustrations of alternative arrangements of power transmission in accordance with the present invention. These figures illustrate a wheel assembly of a vehicle in which the elements associated with the suspension and the brakes have been omitted for clarity. Reference numeral 1 denotes a driving shaft in FIGS. 1 and 2, which is the drive shaft of a vehicle in the embodiments of these figures. A protective tube 15 or similar device is installed around the drive shaft 1. Power is transmitted from the drive shaft 1 to a driven shaft 2 by means of a constant velocity joint generally denoted by reference numeral 3. The driven shaft 2 is fastened to a wheel hub 8 of a vehicle, with a wheel rim 17 being fastened to the hub 8 in a conventional manner.

In the embodiments shown in the FIGS., the constant velocity joint 3 is a so-called improved Rzeppa joint, although it is possible to use other types of constant velocity joints in a transmission arrangement in accordance with the present invention. The constant velocity joint 3 comprises a grooved outer joint section 4 and an inner joint section 5 with similar grooves. Balls 6 or similar means are situated in the grooves of the outer and inner joint sections 4 and 5. The power or torque is transmitted by these balls 6 from the outer joint section 4 to the inner joint section 5, or vice versa.

As shown in FIGS. 1 and 2, the outer section 4 of the constant velocity joint 3 is fastened to the end of the drive shaft 1, with the inner section 5 of the constant velocity joint 3 being fastened in an appropriate manner to the driven shaft 2 so that it does not rotate with respect to the driven shaft 2. The driven shaft 2 is installed within the wheel bracket frame 7, and is supported thereon by means of a first or outer bearing 9 and a second or inner bearing 10 which form a wheel bearing system. The wheel bracket frame 7 is nonrotatable, and is fastened by joints in a suitable manner to supporting arms of the wheel suspension, and in such a manner that movements due to steering and springing are possible. The supporting arms and other supporting elements of the wheel suspension are not shown in the figures, for clarity.

There are substantially vertical notches 11 in the wheel bracket frame 7 surrounding the driven shaft 2 on both sides of a vertical plane passing through the shaft 2, which enable the driven shaft 2 to be turned with respect to the drive shaft 1 with a sufficiently large turning angle, for instance a turning angle of approximately 45° as shown in FIGS. 1 and 2. If the notches 11 are not provided in the wheel bracket frame 7, then the possible turning angle would be considerably smaller (as can be seen in FIGS. 1 and 2).

The embodiments illustrated in FIGS. 1 and 2 differ from one another, only from the point of view of protection of the constant velocity joint 3 and the wheel bearing system 9, 10. These elements must naturally be protected against dust, snow and similar contaminants. In an embodiment in accordance with FIG. 1, protection is carried out in such a way that, firstly, a spherical protective section 12 is formed onto the wheel bracket frame 7 which partially surrounds the constant velocity joint 3 as illustrated. Similarly, a spherical protective section 13 is arranged on the side of the drive shaft 1 and is fastened in a suitable manner, for instance, to the protective tubing 15. The spherical protective section 13 also partially surrounds the constant velocity joint. The diameter of the spherical cover 13 is smaller than the diameter of the spherical protective part 12 so that the spherical protective part 13 and the protective part 12 of the wheel bracket frame 7 partially overlap as illustrated. Therefore, the spherical protective section 13 and the spherical protective part 12 of the wheel bracket frame 7 are able to turn with respect to one another when the wheel is turned. In a turned position, the spherical protective section 13, penetrates into the notch 11 of the wheel bracket frame 7, thus enabling sufficient turning movement. Sealing 14 is installed between the protective part 12 of the wheel bracket frame 7 and the spherical protective section 13, in order to prevent dirt from penetrating into the constant velocity joint 3 or into the wheel bearings.

In the embodiment illustrated in FIG. 2, protection of the constant velocity joint 3 is provided by means of bellows 13a which is, at one end, fastened in a suitable manner to the protective tubing 15, and, at the other end, to a protective part 12a of the wheel bracket frame 7. The protective part 12a may be somewhat smaller than the protective part 12 shown in FIG. 1, because of the bellows 13a. The bellows 13a is fastened to the protective part 12a of the wheel bracket frame 7 by means of suitable fastening elements 14a.

It must naturally be possible to dismantle the constant velocity joint 3 and the wheel bearing system. Therefore, the inner section 5 of the constant velocity joint 3 is fastened to the driven shaft 2, for instance with grooving, and the inner section 5 is locked in position with an axial fastening bolt 16 extending through the driven shaft 2 as illustrated. At the same time, the fastening bolt 16 fastens the first and second bearings 9 and 10 of the bearing system, in the correct position. In other words, clearances of the bearings 9 and 10 can be adjusted by adjusting the fastening bolt 16.

Figure 3:
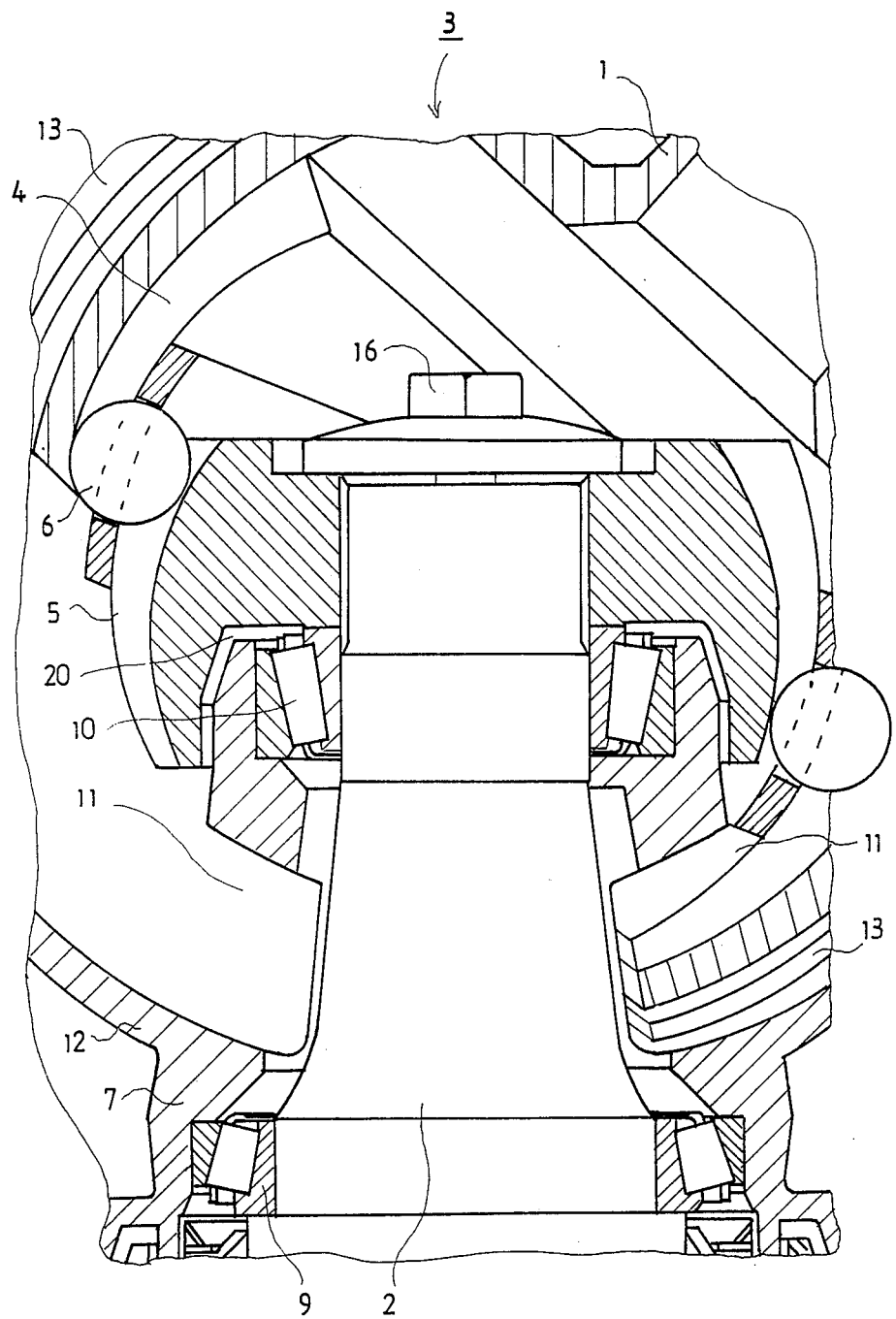
FIG. 3 is an enlarged, detailed view of a portion of FIG. 1.
Figure 4:
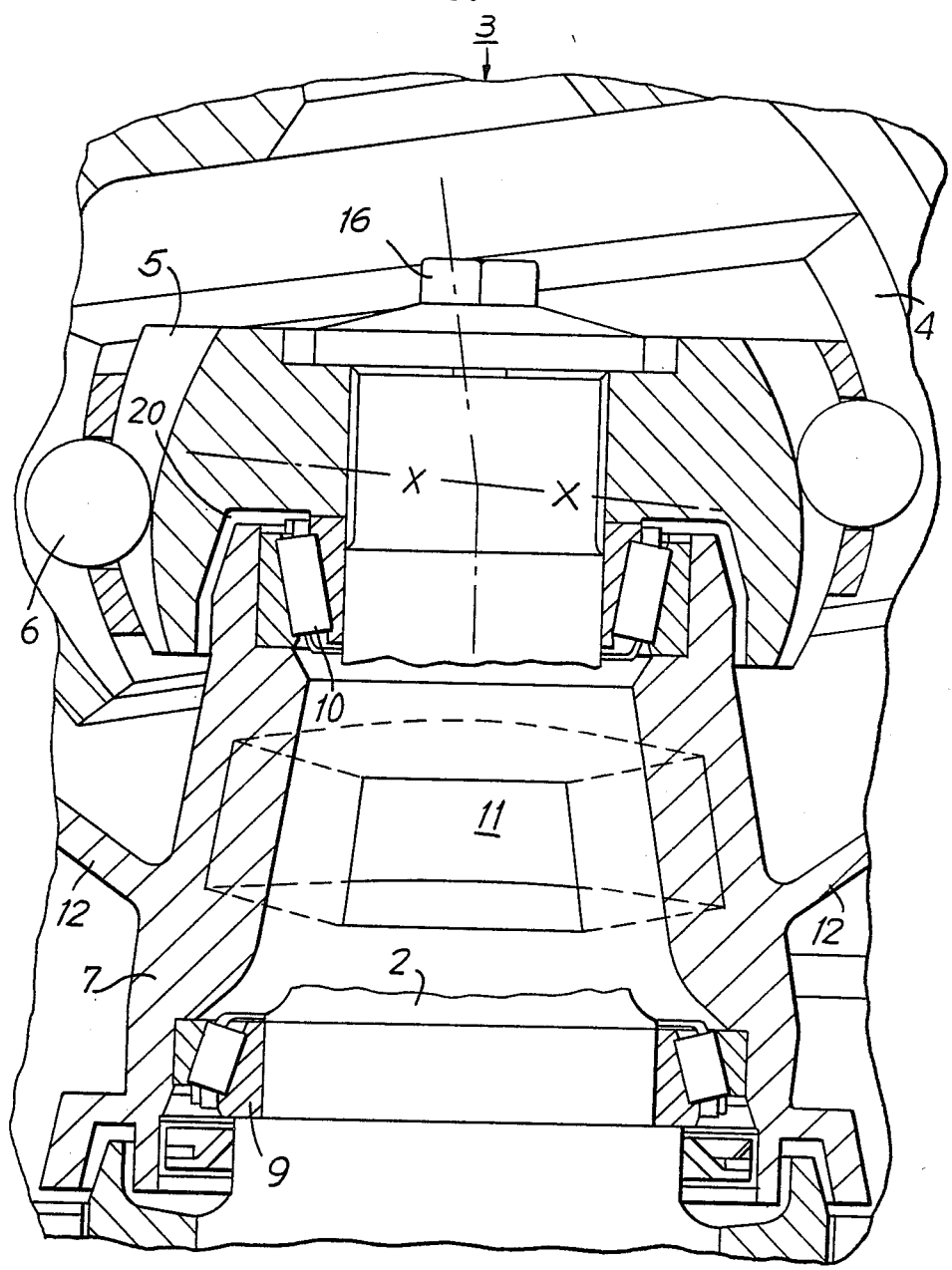
FIG. 4 is a side sectional view of FIG. 3.

An enlarged detail of the arrangement illustrated in FIG. 1 is shown in FIGS. 3 and 4. As is shown in these figures, a recess 20 has been formed in the inner section 5 of the constant velocity joint 3, which makes it possible to fit the second or inner bearing 10 of the bearing system and an inner end of the wheel bracket frame 7 within the inner section 5 of the constant velocity joint 3. With this arrangement, the total axial length of the bearing system and the constant velocity joint 3 is made substantially shorter. As also shown in FIGS. 3 and 4, the notches 11 have been formed into the wheel bracket frames 7 only on the side surfaces thereof. Similar notches are not required in the top and bottom surfaces of the wheel bracket frame 7, because in an independently-suspended axle system, angular movement required by the suspension is so small that the outer section 4 of the constant velocity joint 3 will not hit the unnotched surfaces of the wheel bracket frame 7. Bearing forces of the bearings 9 and 10 of the bearing system must be transmitted by the unnotched area of the wheel bracket frame 7 further on to the suspension elements. Therefore, there can be no notches in the top and bottom surfaces of the wheel bracket frame 7, in order to ensure sufficient strength.

Due to the notches 11 provided in the wheel bracket frame 7, it is possible to implement the bearing system using economical standard bearings, for instance tapered-roller bearings shown in the FIGS. With this arrangement, the bearing distance is made sufficiently wide in order to receive the lateral and longitudinal forces applied to the wheel. A turning axis X—X of the wheel shown in FIG. 4 is suitably tilted or inclined (approximately 5°) and passes through the center point of the constant velocity joint 3, and continues or extends to intersect a road surface near a center plane of a tire. Due to the notches 11 formed into the wheel bracket frame 7 between the bearings 9 and 10, a sufficient steering angle is created without danger of the constant velocity joint 3 or the parts protecting the same hitting adjacent parts.

A transmission system in accordance with the present invention may naturally be used in other applications, in addition to vehicles. In these cases, if large turning angles are required, for instance approximately 90°, two successive constant velocity joint and bearing units can be used, for instance. This type of arrangement is especially possible when there is no need for a principally vertical spring movement. Arrangement of two successive transmission systems in accordance with the invention, is most likely not suitable for vehicle use due to the axial length of the arrangement.

Figure 5:
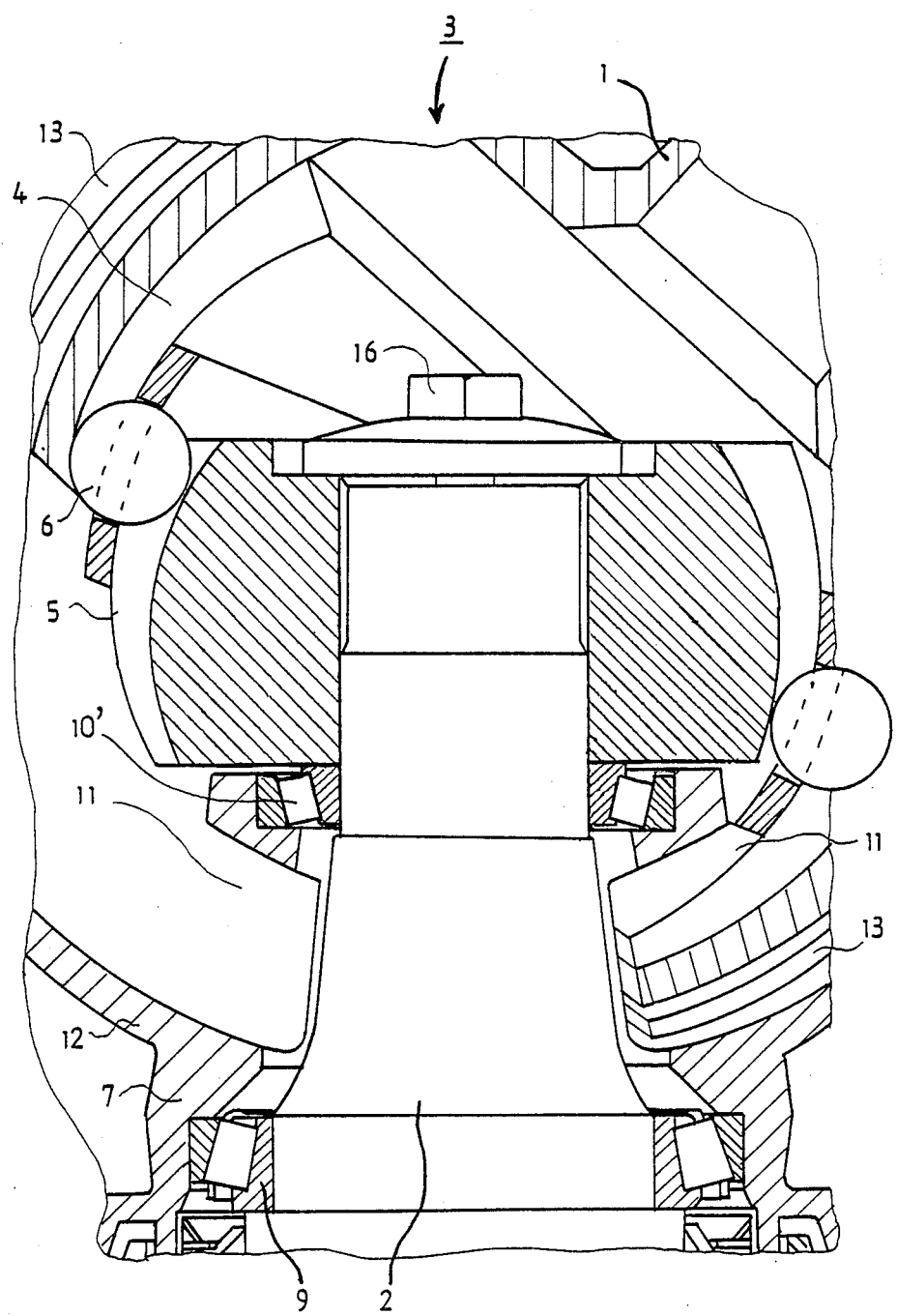
FIG. 5 is a view, similar to FIG. 3, of an alternative arrangement in accordance with the present invention.

FIG. 5 illustrates an example which differs from the features of FIGS. 1 to 4, in that in this example there is no axial recess 20 opening towards the wheel hub 8 in the inner section 5 of the constant velocity joint 3 as shown in the previous figures. Instead, in the example of FIG. 5 the inner bearing 10, and the inner section 5 of the constant velocity joint 3 are arranged side-by-side in the axial direction. This embodiment is not considered preferable to the previous embodiments since, in FIG. 5, the bearing distance is not as wide as in FIGS. 1 to 4. However, the embodiment of FIG. 5 is still advantageous in that, due to notches 11 formed into the wheel bracket frame 7, a large turning angle is provided between the driving shaft 1 and the driven shaft 2. Instead of tapered-roller bearings 9, 10' shown in FIG. 5, the bearings may be angular-contact ball bearings, for example. Furthermore, the bearings 9 and 10 in FIGS. 1–4 may be conventional standard bearings, such as the tapered-roller bearings.

The present invention has been described above by way of examples with reference to the accompanying drawings. However, the present invention is by no means restricted to the aforementioned examples. Many modifications are possible within the framework of the inventive concepts set forth above. Accordingly, the preceding description of the present invention is merely exemplary, and is not intended to limit the scope thereof in any way.

I claim:

1. Apparatus for power transmission, in which power is transmitted from a driving shaft to a driven shaft through a joint having an outer section coupled to said driving shaft and an inner section coupled to said driven shaft which is rotatably supported in a frame surrounding the same, said inner and outer sections being turnable with respect to one another, and said frame including a generally cylindrical part in which said driven shaft is rotatably supported and an at least partially substantially spherical section extending out from said cylindrical part and surrounding said driven shaft, wherein said inner section of said joint is coupled to said driven shaft such that an inner end of said frame cylindrical part towards said joint is at least partially situated within a movement range of said outer section of said joint when said driving shaft and said driven shaft are turned out of axial alignment and at an angle with respect to one another, and at least one notch is provided in said frame cylindrical part and arranged such that said outer section of said joint at least partially penetrates thereinto when said driven shaft and driving shaft are turned by a sufficiently large angle with respect to one another.

2. The combination of claim 1, wherein said joint is a constant velocity joint.

3. The combination of claim 1, wherein power is transmitted to a wheel of a vehicle from said driving shaft through said driven shaft, and said frame is a bracket for the rotating wheel.

4. The combination of claim 1, wherein said driven shaft is rotatably supported on said frame cylindrical part through at least one bearing which is at least partially situated within said outer section movement range when said shafts are turned at said angle with respect to one another.

5. The combination of claim 4, wherein said driven shaft is rotatably supported on said frame cylindrical part through first and second bearings spaced from one another in a direction along said driven shaft, with said notch being formed in said frame cylindrical part between said first and second bearings, and one of said first and second bearings being at least partially situated within said outer section movement range when said shafts are turned at said angle with respect to one another.

6. The combination of claim 5, additionally comprising a plurality of said notches extending along both sides of a plane passing through an axis of said driven shaft.

7. The combination of claim 6, wherein said notches extend substantially vertically on both sides of a vertical axial plane passing through said driven shaft.

8. The combination of claim 5, wherein said joint is located at an end of said driven shaft, and additionally comprising an axial recess formed in said inner joint section and opening in a direction towards an opposite end of said driven shaft from said joint, with one of said first and second bearings and said inner end of said frame cylindrical part being at least partially situated in said recess.

9. The combination of claim 4, wherein said inner joint section is fastened to an inner end of said driven shaft with axial grooving and with a fastening bolt axially extending into said driven shaft, with said fastening bolt also constituting means for adjusting clearances of said at least one bearing.

10. The combination of claim 4, wherein said at least partially substantially spherical section of said frame at least partially surrounds said joint and said bearing.

11. The combination of claim 10, additionally comprising a protective shield mounted to extend around said outer joint section.

12. The combination of claim 11, additionally comprising protective tubing extending about said driving shaft, and wherein said protective shield is substantially spherically-shaped and is coupled to said protective tubing.

13. The combination of claim 11, additionally comprising protective tubing extending about said driving shaft, and wherein said protective shield is a bellows and is coupled to said at least partially substantially spherical frame section and said protective tubing.

14. The combination of claim 5, wherein both said bearings are standard bearings.

15. The combination of claim 14, wherein both said bearings are tapered-roller bearings.

16. The combination of claim 4, wherein said inner joint section and said bearing are arranged side-by-side in an axial direction of said driven shaft.

17. The combination of claim 5, wherein both said bearings are angular contact ball bearings.

18. The combination of claim 5, wherein said at least partially substantially spherical section of said frame extends from said frame cylindrical part between said first and second bearings.

19. The combination of claim 3, wherein said drive and driven shafts are mounted in said joint with a turning axis of the wheel passing through a substantially center point of said joint.

20. Apparatus for transmitting power, comprising a drive shaft;

a driven shaft;

a joint for coupling said drive and driven shafts to one another, and comprising:

an outer section fastened to said drive shaft, and an inner section fastened to said driven shaft, with said drive and driven shafts being turnable with respect to one another, and a frame comprising a generally cylindrical part in which said driven shaft is rotatably mounted and an at least partially substantially spherical part extending out of said cylindrical part and surrounding said driven shaft, wherein said inner section and frame cylindrical part are positioned to be at least partially located within said outer joint section when said drive and driven shafts are turned out of axial alignment with respect to one another and by a certain angle, and said frame cylindrical part comprises at least one notch extending to permit said outer joint section to extend thereinto when said drive and driven shafts are turned by said certain angle with respect to one another.

* * * * *